Oct. 25, 1960　　　　M. STEINMAN　　　　2,957,259
CYCLICALLY CHANGEABLE DISPLAY DEVICE
Filed April 10, 1958　　　　　　　　　　　　4 Sheets-Sheet 1
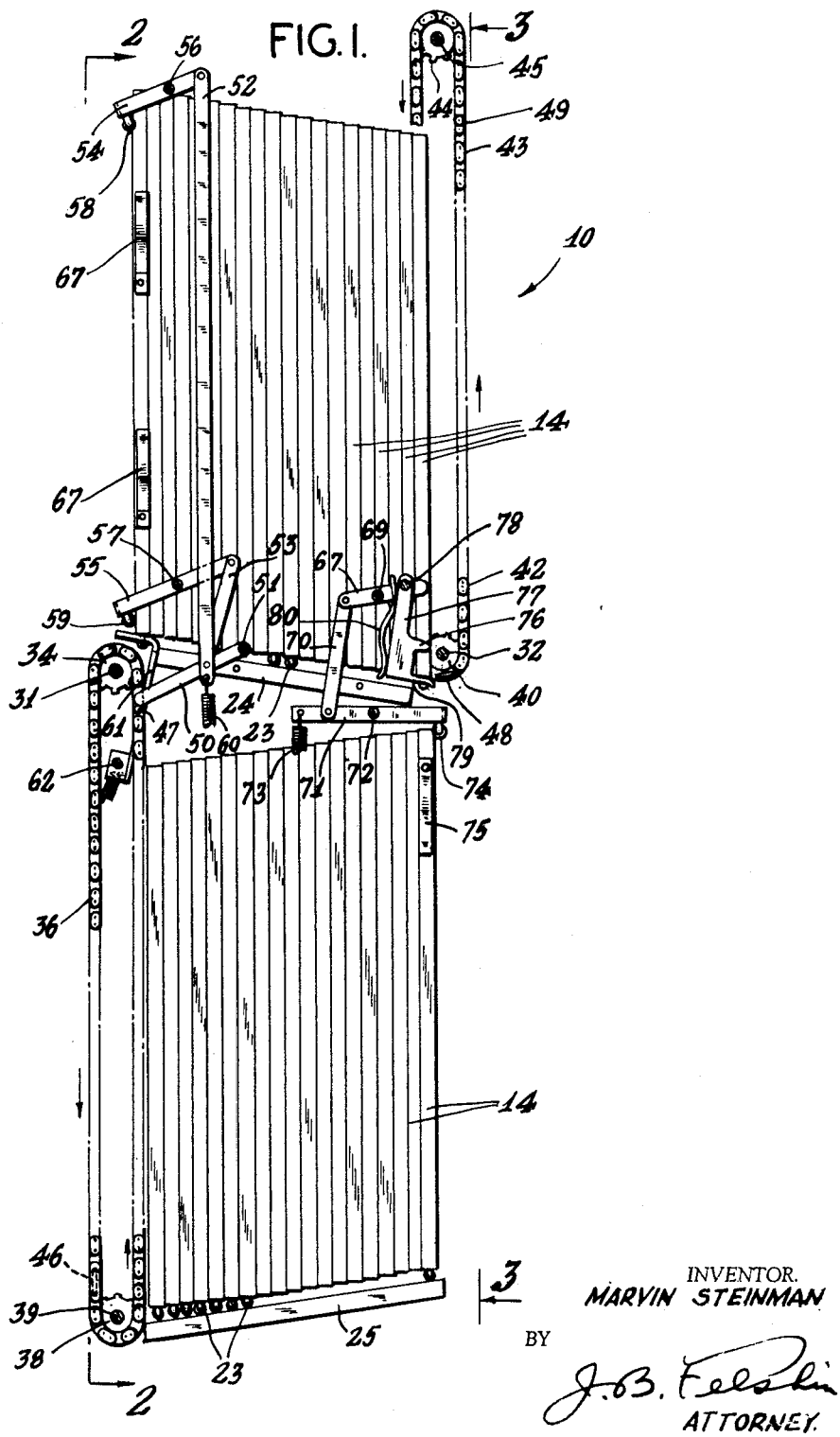
FIG. I.
INVENTOR.
MARVIN STEINMAN
BY
J.B. Felshin
ATTORNEY.

Nov. 1, 1960 W. B. EWING 2,958,259
SKYLIGHT SHADE
Filed Feb. 14, 1957 4 Sheets-Sheet 2
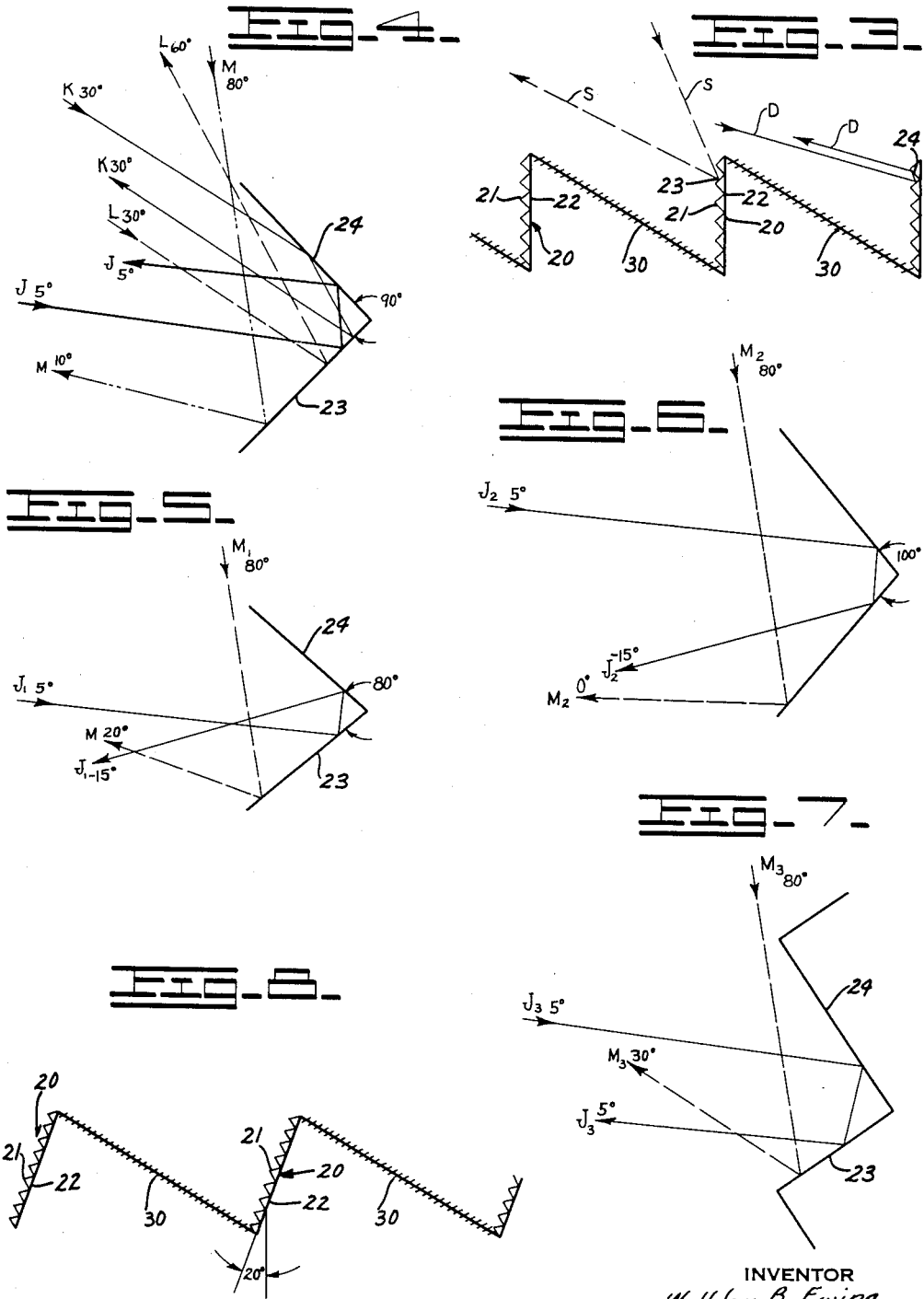
INVENTOR
Walkley B. Ewing
BY
Price and Heneveld
ATTORNEYS

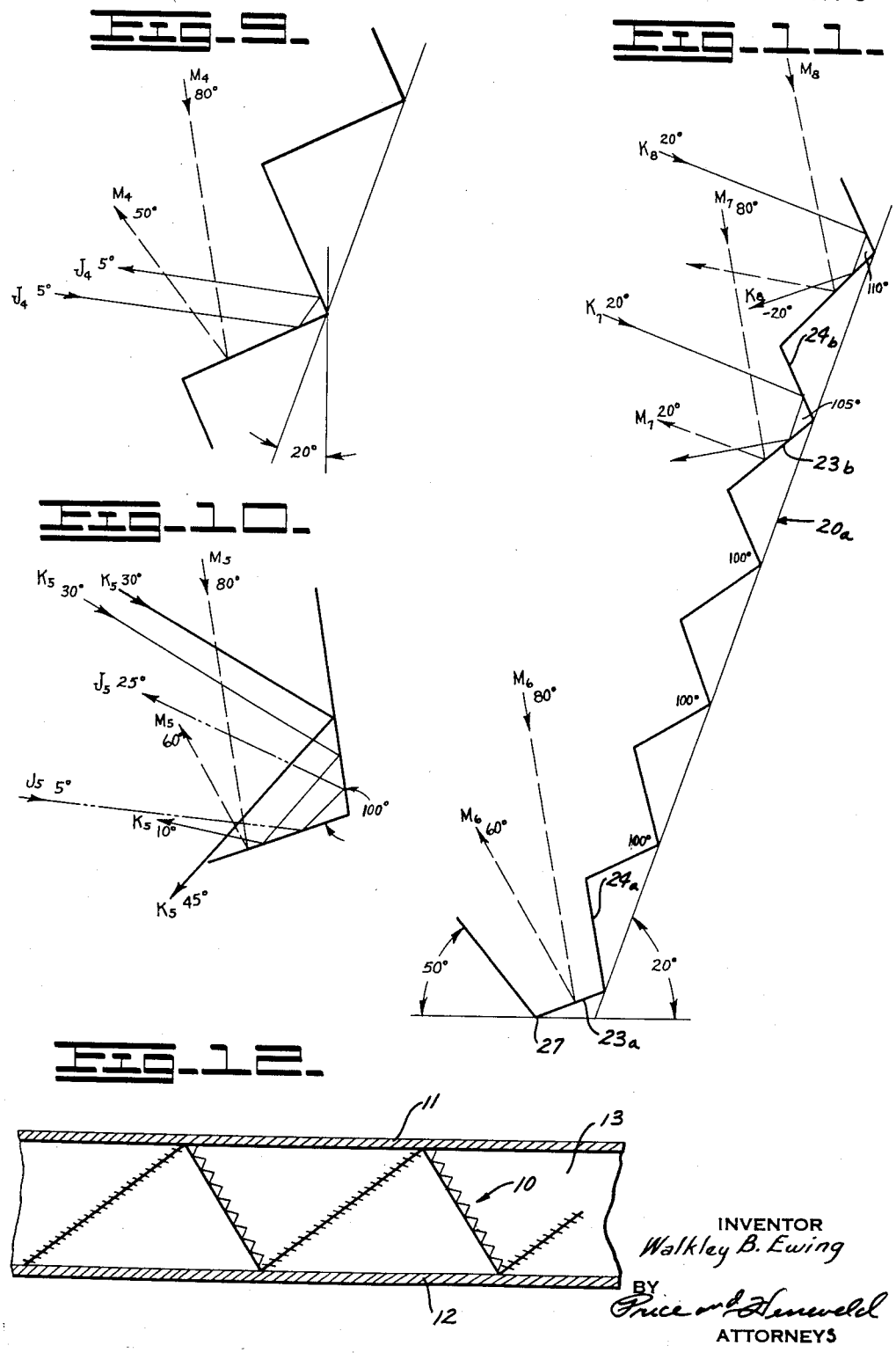

Oct. 25, 1960 M. STEINMAN 2,957,259
CYCLICALLY CHANGEABLE DISPLAY DEVICE
Filed April 10, 1958 4 Sheets-Sheet 4
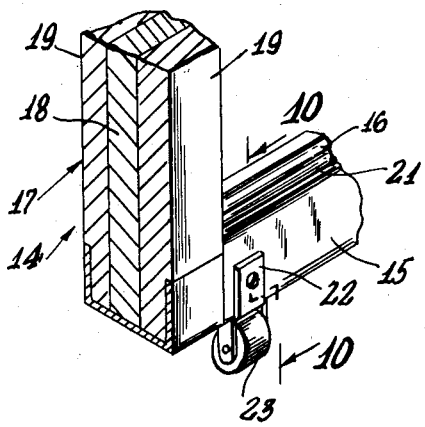
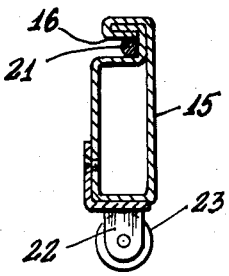
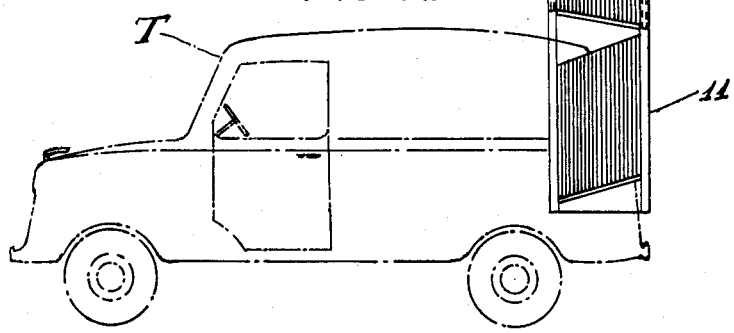
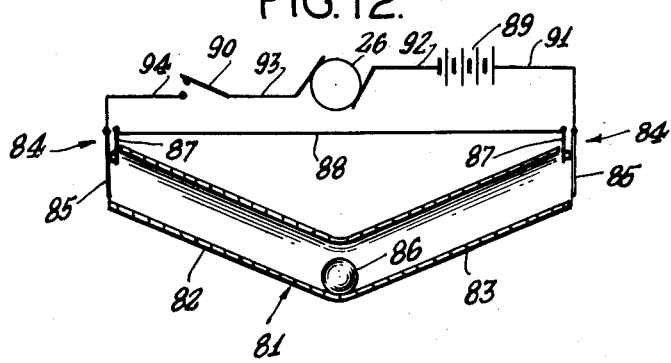
INVENTOR.
MARVIN STEINMAN
BY
*J. B. Felshin*
ATTORNEY.

United States Patent Office 2,958,259
Patented Nov. 1, 1960

2,958,259

SKYLIGHT SHADE

Walkley B. Ewing, 2175 Lake Drive SE.,
East Grand Rapids, Mich.

Filed Feb. 14, 1957, Ser. No. 640,150

12 Claims. (Cl. 88—57.5)

This application relates to the construction of shades or panels for skylights, and more particularly to a specific type skylight shade adapted to intercept direct sunlight but transmit a substantial portion of indirect sunlight.

One of the major problems in the use of skylights is the fact that they not only admit large quantities of useful diffused skylight but also admit undesirable direct sunlight. This direct sunlight produces both a glare and heat that is undesirable particularly during the summer months of severe intensity.

In my copending applications Serial No. 436,542, entitled "Improvement in Skylight Shading," filed June 14, 1954, and Serial No. 507,803, entitled "Corrugated Type Skylight Shading," filed May 12, 1955, I have disclosed a weaving shed type of eclipsing element consisting of a plurality of individual major louvers interconnected and arranged in pairs to form the sides of an inverted V. The louvers which form the sides of the inverted V each have a plurality of minor louvers designed to act as direct solar radiation intercepting means. They admit the diffused or indirect sunlight such as the light deflected from particles in the sky. The structures shown in these applications although satisfactory for particular purposes have their disadvantages.

The structure shown in copending application Serial No. 436,542 provides a very satisfactory screening means for application to the exterior of the skylight. It does not however, provide an eclipsing means entirely suitable for incorporation into a double glazed skylight.

The structure shown in my copending application Serial No. 507,803 is excellent for certain positions of the sun. It is faulty, however, with respect to the interception and control of sun beams when the sun is located in certain other positions. One embodiment of that structure has one side of the inverted V louvered and the other a solid sheet. In north latitudes the shade is arranged with the peaks of the inverted V's running east and west. The louvered panel faces north and the solid panel south. Substantially all direct sun rays are occluded by the louvered panel. However, the rays strike the solid panel and, if the panel is highly reflective, are reflected through the louvered panel into the room. At certain positions of the sun these reflections are highly undesirable because of the glare and heat. Attempts have been made to solve this problem by making the solid panel only slightly reflective to cut down the glare and heat. Such a solution has proven fairly satisfactory for glare control although it has the undesirable effect of absorbing light and creating heat. This solution is particularly unsatisfactory when the structure is enclosed between two glazing elements because the absorbed solar energy results in heating the enclosed space and transmitting considerable amounts of heat into the room below.

An object of this invention is to provide a skylight shade which avoids the disadvantages of the structures disclosed in my aforementioned patent applications.

Another object of this invention is to provide a skylight shade designed to occlude direct or primary reflected light rays from the sun located in certain positions of the sky while permitting such rays at other positions of the sun to pass into the room.

These objects and others will become obvious to those acquainted with the problems of light and heat control upon reading the following specification in conjunction with the accompanying drawing wherein:

Fig. 1 is an oblique, elevational view of a piece of the skylight shading unit of this invention.

Fig. 2 is an oblique schematic view of one inverted V eclipsing element showing its relative position to the sun.

Fig. 3 is a schematic sectional view of a portion of my shading unit illustrating its reflective characteristics.

Figs. 4, 5, 6 and 7 are enlarged, schematic, sectional views of profiles of individual corrugations capable for use with the shading element of Fig. 3.

Fig. 8 is a schematic, sectional, view of a portion of another of my shading units.

Figs. 9, 10 and 11 are enlarged, schematic sectional views of the profile of individual corrugation in panels for use with the shading unit of Fig. 8.

Fig. 12 is an oblique, side elevational view of the skylight shade element between two glass panels.

Fig. 13 is a cross-sectional, elevational view of a modification of this invention.

Fig. 14 is a side elevational view of still another modification of this invention.

Fig. 15 is a cross-sectional, elevational view of a modification for completely closing the shade.

Fig. 16 is a cross-sectional, elevational view of another modification for closing the shade.

Briefly, this invention is concerned with a means for intercepting light passing through a plane normal or inclined to the direction of the light. This means comprises a plurality of sawtooth elements arranged side by side. Each of the elements includes two panels extending transversely to the plane through which the light passes and converging toward each other. One of the panels has slots formed by plurality of parallel louvers extending lengthwise thereof for intercepting direct rays from the sun. The other panel is corrugated and impervious to light. The corrugations of the impervious panel are shaped so that some of the surfaces reflect light rays having a high shadow angle back into sky. Other surfaces reflect light rays from low shadow angles toward and through the louvered panel.

Referring specifically to the drawings, reference numeral 10 denotes a skylight eclipsing unit of saw-tooth shape. This unit includes a plurality of V-shaped elements consisting of two panels, 20 and 30. Panel 20 is impervious to light and is corrugated on the upper side in a manner described in more detail hereinafter. The panel 30 is formed by a plurality of spaced horizontal louvers 31 extending lengthwise of the panel forming light transmitting spaces or slots between the louvers. The two panels 20 and 30 form an inverted V having an apex or peak 40.

The louvers 31 of the panels 30 are inclined to the plane of the panel to provide light-transmitting slots between the louvers. The exact inclination of the louvers 31 in respect to the plane of the panel 30 is determined by the eclipse zone desired and the inclination of the panel itself. The exact and preferred inclination of the louvers 31 is taught in my copending applications Serial Nos. 436,542 and 507,802. As noted in these applications, particularly application Serial No. 436,542, the preferred inclination is 30° to the plane of the panel. The novel part of this invention lies in the corrugated panel 20 combined with the louvered panel 30.

The panel 20 is formed of two parts—a corrugated outer panel part 21 and a smooth reflective inner panel 22. The corrugated panel 21 reflects sunlight beams from various sectors of the sky back into the sky or through louvers 31 of panel 30. The shape of the corrugations and position of panels 20 and 30 will be explained in more detail hereinafter. The panel 22 reflects incident beams passing through the openings between louvers 31 into the room beneath the shade unit.

In the preferred form of this invention of ridges or peaks 40 of the inverted V's eclipsing member 10 extend in an east-west direction. This arrangement is important because of the generally east-to-west paths of the sun and their relationship to the longitudinal axes of the louvers. In north latitudes the corrugated panels face south while in south latitudes the panels face north.

With the peaks running east and west the sun "sees" the peaks on a certain line of sight. A plane including this line of sight and the axis of any individual peak will form an angle with an intersecting horizontal plane usually referred to as the "profile angle." I call it the "shadow angle." Therefore, in this description the "shadow angle" is the angle through which a horizontal plane passing through the peaks of the shade teeth must be rotated to include the position of the sun.

The elevation angle or azimuth of the sun should not be confused with the "shadow angle." These angles are related but different. The following formula expresses the relationship;

$$\tan A = \frac{\tan B}{\cos C}$$

In this formula $A$=shadow angle; $B$=altitude of sun over horizon expressed in degrees; and $C$=azimuth of sun expressed in degrees east or west from south.

Fig. 2 diagrammatically illustrates this relationship. The plane P is a horizontal plane passing through the apexes or peaks 40 of panels 20 and 30. The peak 40 is shown running east and west with the sun located southwest. The plane P' represents a plane rotated about the peak 40 to include the position of the sun. The angle A which the plane P' makes with plane P is the shadow angle. Angle B measured between the plane P and the direction of the sun's rays is the altitude or elevation angle. Angle C measured between the north-south line and the vertical projection line Y of the sun's rays on plane P is the azimuth or bearing angle.

It is well known that the shadow angle A changes during the day and seasons. The equinoxes on March 21 and September 23 are the only days when the shadow angle remains constant. The elevation and azimuth angles, however, change during the day as the sun rises and sets. The following table illustrates this phenomenon for lat. 44° N. The table is based on solar time.

| Solar Time | Shadow Angle A | Elevation Angle B | Azimuth Angle C |
|---|---|---|---|
| June 22: | | | |
| 5:00 | 165 | 6 High | 27 N of E. |
| 8:00 | 89 | 37 High | 2 S of E. |
| 10:00 | 73 | 58 High | 60 E of S. |
| 12:00 | 69½ | 69½ High | S. |
| Equinox: | | | |
| 6:00 | 46 | Rises | Due E. |
| 8:00 | 46 | 21 High | 69 E of S. |
| 10:00 | 46 | 38 High | 40 E of S. |
| 12:00 | 46 | 46 High | Due S. |

The sun intensity in a clear sky is dependent on its altitude. The intensity can never be determined from the shadow angle alone because, as should be evident from Fig. 2 the shadow angle may be great even when the sun is slightly above the horizon at which time the sun's intensity is low because of the filter effect of the atmosphere. For example, on June 22 at 5:00 o'clock a. m. or p.m. the shadow angle is 165 degrees but the intensity is obviously very low. Nevertheless, the shadow angle is important when working with the shading device of this invention, because knowing the shadow angle the shading device can be arranged to occlude undesirable sun rays while admitting others.

The sawtooth structure shown and described in my copending application Serial No. 507,803 is composed of louvered panels and solid baffles. The solid baffles of low reflectivity intercept the sun rays and absorb them. This has two disadvantages. First, the heat absorbed during the summer months creates an undesirable heating effect especially when the shading elements are sandwiched between two panes of glass. Secondly, the less intense, south rays occurring during the winter months are not reflected into the room and thus can not be utilized.

The shading element of this invention eliminates these disadvantages by providing the corrugated panel 20 capable of reflecting undesirable intense sun rays back into the sky and desirable less intense rays through the louvers into the room. To accomplish this two distinct sets of reflective surfaces 23 and 24 are provided on panels 20. The arrangement of these surfaces and the inclination of the overall panel 20 determines those rays that are rejected and accepted.

Fig. 3 is an embodiment having an inclined louvered panel 30 and a vertical corrugated panel 20. The corrugations of the sheet 21 have 90° corners. Thus, a single-reflected beam S striking surfaces 23 is reflected into the sky. Double-reflected rays D striking either of the surfaces and reflecting off the other are reflected back in exactly the same profile plane as that in which they approached.

Fig. 4 illustrates the light control pattern for the embodiment of Fig. 3 in which the surfaces 23 and 24 form equilateral 90° angles. Rays having profile angles between 0° and 45° either reflect from one surface to the other and then back to the sky at the same shadow angle (rays J and K) or they reflect by single reflection back into the sky (ray L). The sun rays having shadow angles between 45° and 60° are directly reflected to the sky. The sun rays, such as ray M, having profile angles between 60° and 90° leave the surface 23 at 10° and hence hit the louvered panel 30. By secondary and tertiary reflection these rays are ultimately directed downwardly into the room. Rays having a small shadow angle such as J do not reflect into the room because they strike only those corrugations at the top of the inverted V.

This structure disclosed by Figs. 3 and 4 is a good structure for major rejection of direct sunlight and significant transmission only of subdued and north light. It is so effective in admitting the light from those portions of the sky where the sun is never to be found that it has the property of transmitting more light on a dull overcast day than on a bright sunny one. This is due to the fact that the particles in the sky on a cloudy day reflect the sun rays, making the sky appear on the whole brighter when cloudy than when blue except for that small sector immediately around the sun.

In order to balance this blue-cloudy day transmission especially in order to admit light when the sun is in its low winter positions, I modify the corrugated baffles of Figs. 3 and 4 in different ways.

One way of altering the light reflection properties of the corrugated baffles is to change the angle between the surfaces 23 and 24. Fig. 5 shows a configuration in which the surfaces are arranged at 80° to each other. This changes the angle at which the rays will be reflected from the surfaces. For example, the ray $J_1$ strikes surface 23 and is reflected to surface 24. It emerges from the surface 24 at a minus 15°, rather than plus 5° as shown in Fig. 4. Ray $M_1$ having a shadow angle of 80° is reflected from the surface 23 at an angle of 20°. Ray $J_1$ will strike and be partially transmitted through the louvered panel 30 (Fig. 3).

Fig. 6 discloses a 100° angle between the surfaces. With this pattern the 80° ray $M_2$ is reflected horizontally. Ray $J_2$ is reflected in a 15° direction. Both of these rays will strike and partially transmit through panel 30.

Figs. 5 and 6 illustrate the principle of varying the angle between the two surfaces 23 and 24 to obtain the different directions of sun rays reflections. Another way of altering the reflection pattern of the corrugated panel 20 is to leave the junction angle between the surfaces 23 and 24 at 90° but to change their relative lengths. This changes the orientation of the two surfaces 23 and 24 with respect to the sun and sky (Fig. 7). The comparison of this configuration with those of Figs. 4, 5 and 6 indicates the ray $M_3$ having an incident shadow angle of 80° is reflected in a 30° direction. The ray $J_3$ having the double reflection follows the same course of direction as the ray J of Fig. 4. This is true of all double reflections from 90° corner reflectors.

Since the rays having a large shadow angle are directed more into the sky, this configuration offers a definite method of further directing back into the sky intense primary reflections from rays having great shadow angles. This avoids reflection of these undesirable rays through the louvered panel 30.

It should be evident that altering the basic reflecting unit of Fig. 3 in the ways illustrated by Figs. 5, 6 and 7 greatly affects the direction in which the rays are reflected from the corrugated surface. Many combinations of these alterations are possible for obtaining the desired result.

Fig. 8 discloses still another method of varying the characteristics of the shade. This involves changing the inclination of the corrugated panel. Rotation of the entire panel in a clockwise direction rotation all of the single-reflected rays, previously described, in a clockwise direction and twice the number of degrees of the panel rotation (Fig. 9). Thus, ray $M_4$ having a shadow angle of 80° is reflected off surface 23 in a 50° direction instead of 10° as in Fig. 4, but the double-reflected sun ray $J_4$ having a shadow angle of 5° is reflected exactly like that of Figs. 4 and 7 because of the right angle corner.

The three basic design changes previously described can be combined in many ways to produce various desired results or to cope with such related problems as changes of roof pitch, building orientation, or geographical latitude. Fig. 10 illustrates a configuration combining the three basic alterations. The corner between the two surfaces 23 and 24 is a 100° angle. The overall corrugated panel is inclined at an angle of 20° from the vertical therefor, the two surfaces 23 and 24 are different lengths. Analyzing the effect of such a configuration, the 80° ray $M_5$ is reflected at 60°. The 5° ray $J_5$ has a double reflection finally emerging at 25°. The 30° ray $K_5$ shown is either singly reflected directly through the louver panel 30 at or double reflected in a 10° direction. It is impractical and impossible to discuss the courses of all rays. Those discussed and illustrated by Fig. 10 are considered sufficient to illustrate the principle.

Sun rays having a low shadow angle are not very intense. Therefore, the glare and heat created by them is not undesirable. On the other hand, rays of high shadow angle during the middle of the day are extremely undesirable because of their great intensity. Therefore, the most useful combination of alterations in the corrugated panel may be one in which there are progressive changes in the reflective characteristics from the top to the bottom of the panel. Fig. 11 illustrates such a modification.

Reference numeral 20a denotes the modified corrugated panel. This panel begins at the juncture 27 with a surface 23a inclined at 20° from the horizontal. The surface 24a forms a 100° angle with surface 23a. Each successive surface 23 is 5° steeper. At the top portion of the panel 20a the surface 23b is inclined 40° to the horizontal. The angle between surfaces 23b and 24b is increased to 105°. The angle between the surfaces immediately above is 110°.

This configuration produces the light pattern illustrated by the light rays $M_6$, $M_7$, $M_8$, $K_7$, and $K_8$. $M_6$ is an 80° beam striking the lower portion of the corrugated panel at surface 23a. This ray or beam is deflected at 60° into the sky. 80° rays, such as $M_7$ striking the upper portion of panel 20a are reflected at 20° which passes above the panel 30 and into the sky. Ray $M_8$ striking the uppermost portion of panel 20a is reflected at 10° thus also passing over panel 30. Rays $K_7$ and $K_8$, each having the small shadow angle of 20° are directed at —10° and —20°, respectively to panel 30. Thus with the arrangement of Fig. 11 panel 20 transmits a fair portion of beams having a low shadow through the louvered panel. The lower corrugations reflect all beams having a high shadow angle back into the sky. Since the low winter sun rays only strike the upper corrugations, a fair portion of these desirable beams will be reflected through the louvers. The same corrugations at the top will reflect the beams having a greater shadow angle at flat angles so that these beams will pass over the adjacent panel 30. Corrugations at the lower portion of the panel 20a are never irradiated by a low shadow angle sun. Therefore their configuration can be designed without regard for the incident of such beams.

Fig. 12 shows the shading element 10 interposed or sandwiched between two transparent sheets 11 and 12. These sheets are supported and joined at their margins by any suitable type of frame structure such as that disclosed in my copending application Serial No. 507,803. For example, as shown in Fig. 18 of the drawings of said application, the frame involves a peripheral wall structure in the form of a box frame. The box frame is disposed between the transparent sheets 11 and 12 at the peripheries thereof. The box frame separates the transparent sheets 11 and 12 from one another. The entire central portion of the skylight structure is a hollow chamber 13. Eclipsing element 10 is enclosed in the chamber 13. It is not essential that the peaks of the panels contact both sheets 11 and 12. Such contact may be desirable to prevent a vertical movement of the eclipsing element. On the other hand, the transfer of absorbed heat from element 10 to the room below would be minimized by interposing an air space or other insulating medium between it and sheet 12, while preferably maintaining contact with sheet 11.

Fig. 13 shows another modification in which the saw tooth element 10 is supported in a transparent container 62 mounted below a conventional skylight panel 61. This construction has the advantage of being able to be mounted in a conventional existing skylight frame 60 that ordinarily supports only the skylight glass panel 61. In accordance with this embodiment of my invention I insert the transparent container 62 between the frame 60 and the glass. The container 62 has a filtered breather plug 63. This modification shows the reflected light rays R and the transmitted light rays T.

Fig. 14 shows a modification using the saw tooth element 10 with a conventional transparent plastic dome 70. The shading element 10 is supported on a panel of translucent or transparent material 71. The panel 71 can be a pane of glass or synthetic resin. Panel 71 has a breather plug 72. The dome structure of Fig. 14 combined with the saw tooth shading element 10 has the advantage of picking up sun rays having a low shadow angle. The dome 70 is less reflective of such rays than a horizontal frame of glass or plastic. Instead it more completely transmits them into the chamber 73 formed between the panel 71 and the dome 70. These transmitted beams strike the shading element 10 and are reflected into the room in the manner previously described. Thus the entire assembly has the ability of picking up low soft sun that is ordinarily reflected on a flat glass panel such as that disclosed in Figs. 12 and 13.

Fig. 15 is a modification of my invention designed for opening or closing the shade, to permit lighting or darkening of the room. The corrugated panel 20b is made in two separate parts, 21b and 22b. Corrugated part 21b is adapted to be pivotally mounted at a juncture 27 between adjacent teeth. They are adapted to be swung against the panel 22b as shown in full lines, or against the louvered panel 30 as shown in phantom. In the first or open position the sun rays are reflected on the corrugations. In the second or closed position part 21b is pivoted against the louvered panel 30 to prevent transmission of any light. All of the corrugated parts 21a are secured together by the rod 28 and thus they are actuated at the same time at one operation station.

The embodiment of Fig. 15 is adapted for a second purpose, that is, to change the inclination of the corrugated panel for modifying the light transmission pattern.

Fig. 16 discloses another modification for completely shutting off all light transmission. In this modification rather than pivoting the corrugated panel the flat reflector panel 22c is pivotally attached to the peak 40c. Thus in one position shown by the solid lines the panel 22c rests against the back of the corrugated panel 21c. The light can then be transmitted through the louvered panel 30. In a second position, panel 22c is swung against the louver panel 30c preventing the transmission of any light through the panel 30c. In this modification the panels 22c are coupled together by rods 28c which are actuated together at a central operation station.

Having described my invention it should become obvious that although I have disclosed certain embodiments, other embodiments and modifications are possible within the spirit of this invention. Therefore all of these modifications are considered to be covered by this invention unless the appended claims by their language expressly state otherwise.

I claim:

1. Means for intercepting light passing through a plane normal or inclined to the direction of said light, said means comprising: a plurality of elongated, substantially V-shaped, elements arranged side-by-side; each of said elements including two panels forming the legs of the V-shaped element and extending transversely to said plane, at least one of said panels being inclined toward the other panel; one of said panels having slots formed by a plurality of parallel, light impervious louvers extending lengthwise thereof for intercepting direct rays from said light; the side of said other panel facing the slotted panel of its V-shaped element being light impervious, corrugated and light reflective for reflecting rays from said light in a direction away from or toward said slotted panel depending upon the angle of said light.

2. Means for intercepting light passing through a plane normal or inclined to the direction of said light, said means comprising: a plurality of elongated, substantially V-shaped, elements arranged side-by-side; each of said elements including two panels extending transversely to said plane, at least one of said panels being inclined toward the other; one of said panels having slots formed by a plurality of parallel, light impervious louvers extending lengthwise thereof for intercepting direct rays from said light; the side of said other panel facing the slotted panel being corrugated, light impervious and light reflective; said corrugated panel being formed by a plurality of V-shaped sections extending lengthwise of said panel, each of said V-shaped sections having one surface arranged to reflect and direct light rays from desired directions toward and through said slotted panel, the other surface being arranged to deflect light rays from undesired directions away from said slotted panel.

3. Means for intercepting light passing through a plane normal or inclined to the direction of said light, said means comprising: a sheet having a plurality of groups of light impervious louvers therein, said louvers being parallel to each other and inclined to the plane of said sheet; an imperforate panel between each group of said groups of louvers; said sheet being formed into a plurality of generally V-shaped elements each having a pair of sides inclined toward one another; alternate ones of said sides containing one group of said groups of louvers; each of the other sides being one of said imperforate panels; and a corrugated, light reflective sheet secured to the upper side of said imperforate panel facing the louvers forming the other leg of its V-shaped element, said corrugated sheet providing a surface for reflecting rays from said light in a direction toward or away from the group of louvers it faces depending upon the angle of the light striking said corrugated sheet.

4. A skylight panel for intercepting direct solar radiation, said panel comprising: a plurality of parallel louvered elements inclined to the plane of said panel and each having a plurality of light impervious louvers parallel to each other and inclined to the plane of their element; a plurality of imperforate elements each forming a V with one of said louvered elements and having a corrugated surface between each of said louvered elements and facing said one louvered element, said corrugated surface being light reflective and arranged to reflect certain solar radiations away from said louvered elements; a pair of spaced light transmitting sheets having said elements sandwiched therebetween.

5. A skylight panel for intercepting direct solar radiation, said panel comprising: a plurality of parallel louvered panels inclined to the plane of said skylight panel and each having a plurality of light impervious louvers parallel to each other and inclined to the plane of their element; a plurality of imperforate panels each forming a V with one of said louvered panels and having a corrugated surface and located between each of said louvered panels and facing said one louvered panel, each of said corrugated surfaces being light reflective and having secondary surfaces arranged to reflect certain solar radiations away from louvered panels and other secondary surfaces arranged to reflect other solar radiations toward and through said louvered panels; and a pair of spaced light transmitting sheets having said elements sandwiched therebetween.

6. A skylight panel for intercepting direct solar radiations of large shadow angles and passing reflected solar radiations of small shadow angles comprising: a plurality of parallel louvered panels inclined to the plane of said skylight panel and each having a plurality of light impervious louvers parallel to each other and inclined to the plane of their elements; a plurality of imperforate panels each forming a V with one of said louvered panels and having a corrugated surface located between each of said louvered panels and facing said one louvered panel; each of said corrugated surfaces being light reflective and arranged to reflect said solar radiations of large shadow angles away from said louvered panels and said solar radiations of small angles toward and through said louvered panels.

7. A skylight panel for intercepting direct solar radiations of large shadow angles and passing reflected solar radiations of small shadow angles comprising: a plurality of parallel louvered panels inclined to the plane of said skylight panel and each having a plurality of light impervious louvers parallel to each other and inclined to the plane of their panel; a plurality of imperforate panels each forming a V with one of said louvered panels and having corrugated surfaces and facing said one louvered panel; said corrugated surfaces being light reflective and arranged to reflect said solar radiations of large shadow angles away from said louvered panels and said solar radiations of small angles toward and through said louvered panels; a pair of spaced light transmitting sheets having said elements sandwiched therebetween.

8. A skylight panel for intercepting direct solar radiation, said panel comprising: a plurality of parallel louvered panels inclined to the plane of said skylight panel and each having a plurality of light impervious louvers parallel to each other and inclined to the plane of their panel; a plurality of imperforate panels each forming a V with one of said louvered panels and having corrugated surface and located between each of said louvered elements and facing said one louvered panel, each of said corrugated surfaces being light reflective and having secondary surfaces arranged to reflect certain solar radiations away from said louvered panels and other secondary surfaces arranged to reflect other solar radiations toward and through said louvered panels; a transparent support element; a transparent dome arranged on said support element to form a chamber therebetween; said louvered and imperforate panels being contained in said chamber.

9. A skylight panel for intercepting direct solar radiation, said panel comprising: a plurality of parallel louvered panels inclined to the plane of said panel and each having a plurality of light impervious louvers parallel to each other and inclined to the plane of their panel; a plurality of imperforate panels each forming a V with one of said louvered panels and having a corrugated surface located between each of said louvered panels, each of said corrugated surfaces being light reflective and having secondary surfaces arranged to reflect certain solar radiations away from said louvered panels and other secondary surfaces arranged to reflect other solar radiations toward and through said louvered panels; a transparent skylight element; a transparent container arranged below said element to form a chamber therebetween; said louvered and imperforate panels being contained in said chamber.

10. Means for intercepting light passing through a plane normal or inclined to the direction of said light, said means comprising: a plurality of elongated elements arranged side-by-side; each of said elements including two panels extending transversely to said plane, at least one of said panels converging toward the other and forming a V; one of said panels having slots formed by a plurality of parallel light impervious louvers extending lengthwise thereof for intercepting direct rays from said light; the other panel being constructed of two separate sheets arranged back to back; one of said sheets being corrugated light reflective and facing the louvered panels forming its V; the other of said sheets being light reflective and facing in a direction away from the louvered panel forming its V; said corrugated sheet being shaped and arranged to direct solar radiations both away from and toward the louvered panel forming its V.

11. The light intercepting means of claim 10 in which the corrugated sheet is pivotally mounted at its lower edge for pivotal movement against an adjacent louvered panel.

12. The light intercepting means of claim 11 in which the other sheet is pivotally mounted at its top edge for pivotal movement against an adjacent louvered panel.

References Cited in the file of this patent

UNITED STATES PATENTS

| | | |
|---|---|---|
| 286,137 | Hyatt | Oct. 2, 1883 |
| 458,850 | Jacobs | Sept. 1, 1891 |
| 717,783 | Wadsworth | Jan. 6, 1903 |
| 1,827,624 | Smith et al. | Oct. 13, 1931 |
| 2,545,906 | Watkins | Mar. 20, 1951 |